March 29, 1949.     S. BLOOMFIELD     2,465,839
WASTE CONTAINER
Filed May 7, 1945

INVENTOR.
Samuel Bloomfield
BY
ATTORNEY.

Patented Mar. 29, 1949

2,465,839

UNITED STATES PATENT OFFICE 2,465,839

WASTE CONTAINER

Samuel Bloomfield, Wichita, Kans., assignor to C. Earl Hovey, Kansas City, Mo., as trustee Application May 7, 1945, Serial No. 592,427

1 Claim. (Cl. 220—1)

This invention relates to waste containers in the nature of waste paper baskets, garbage receptacles, and similar equipment, where the waste collects rather rapidly, and it is desirable to have a comparatively small container therefor.

The primary aim of this invention is the provision of a waste container, having means for compressing the collected material as it is deposited, and structure for quickly and conveniently evacuating the container when the same has been filled with compressed waste.

This invention has for further aims to provide a waste container that has unique structure for compressing the waste material as it is collected, and convenient parts for allowing the introduction of the waste to the container while the latter is maintained in a substantially closed condition for purposes of appearance and sanitation.

Structural features of the waste container contemplated by this invention, are unique within themselves and therefore, constitute some of the objects which will become apparent during the course of the following specification, referring to the accompanying drawing, wherein.

It is common practice to locate relatively small waste receptacles in kitchens, bedrooms, offices or other places where waste collects at a rapid rate, but these receptacles are preferably small and should be of an attractive character. Small receptacles are conventionally employed, but after the same have been in use for a short time, it becomes necessary for the depositor of the waste to follow the same into the receptacle with his hand to compress the contents thereof in order that more waste may be received thereby. Obviously, this objectionable and even unsanitary practice should be obviated, and it is possible so to do through the employment of a waste receptacle made as illustrated in the accompanying drawing.

Figure 1:
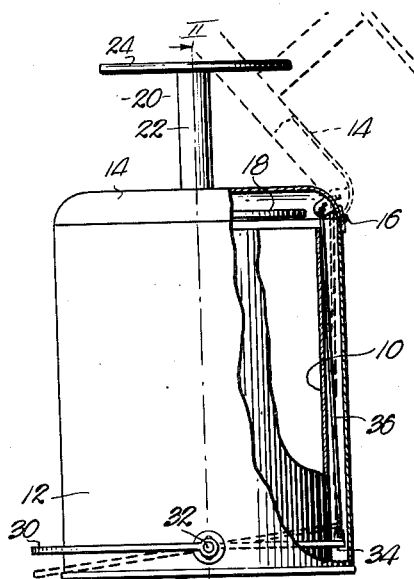
Fig. 1 is a side elevational view of a waste container, made in accordance with the present invention, but having portions thereof broken away to reveal part relationship.
Figure 2:
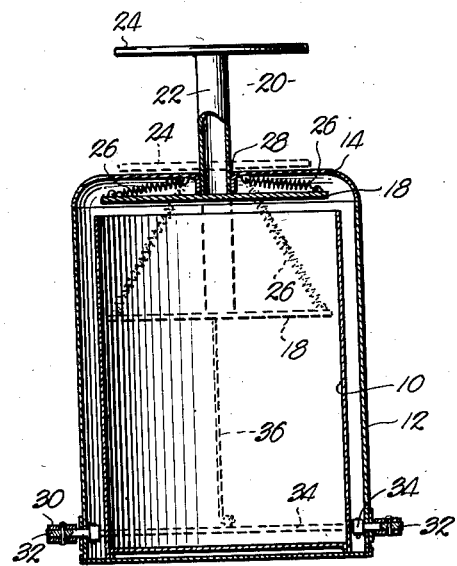
Fig. 2 is a vertical sectional view taken on line II—II of Fig. 1.
Figure 3:
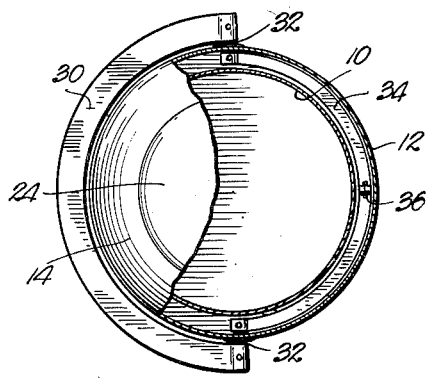
Fig. 3 is a top plan view of the waste container, with a portion thereof shown in section.

In the form of the invention shown in Figs. 1 to 3 inclusive, the numeral 10 designates a receptacle which may be cylindrical in shape and having an open top to receive the waste that may be deposited therein.

This receptacle 10 is contained within a housing 12 that is provided with a lid 14 to normally close the open top of the housing when waste is not actually being deposited in receptacle 10.

Lid 14 is hingedly mounted as at 16 and may, therefore, be swung from the position shown in full lines of Fig. 1, to that position illustrated in dotted lines of said figure. Lid 14 is dish-shaped and the laterally projecting marginal portion thereof circumscribes head 18 of a plunger 20 which is manually shiftable to and from a normal position such as that shown in Figs. 1 and 2.

Plunger 20 has, besides head 18, a stem 22 and a platform 24 upon which the operator may step or apply his hand to force plunger 20 into receptacle 10.

A number of springs 26 yieldably maintain the plunger 20 in the normal condition just described, and when waste is to be compressed, pressure upon platform 24 will move head 18 downwardly into receptacle 10 and to the maximum distance illustrated in dotted lines of Fig. 2. Springs 26 will, of course, be extended and return the entire plunger assembly when pressure on platform 24 is released. Springs 26 should be in opposed relation and in the instance shown, are radially mounted with one end secured to lid 14 while their other ends are attached to head 18. Thus, equalization of retrieving action is created and no binding at the point where stem 22 passes through opening 28 of lid 14, will occur. Obviously, this opening 28 is axially disposed with respect to receptacle and housing 10 and 12 respectively, and head 18 is disc-shaped to enter receptacle 10.

Lid 14 is moved to the open position by structure forming a part of the assembly and including a foot pedal 30 of a form clearly illustrated in Fig. 3. The ends of this arcuate foot pedal 30 are pinned or otherwise secured to stub shafts 32 respectively, that pass into housing 12 to engage an arcuate lever 34. This arcuate lever 34 is rigid to the stub shafts 32 and a link 36 has one end attached to its upper surface as illustrated in Fig. 1. The other end of link 36 is in engagement with lid 14 just inside of hinge 16, and when pedal 30 is depressed to the position shown in dotted lines of Fig. 1, lid 14 will be raised to allow waste to be deposited into receptacle 10. The ends of link 36 are, of course, pivotally secured to their respective associated elements, i. e., the lever 34 and lid 14, and the action just described is permitted without binding. Link 36 as well as lever 34 occupies a position in the space between receptacle 10 and housing 12, the former being slightly smaller in diameter than the latter.

The arcuate form of lever 34 insures that receptacle 10 will not accidentally offset from a position where head 18 will operatively enter the same.

The operation and use of the waste container embodying that form of the invention which has been chosen for illustration by Figs. 1, 2 and 3, is obvious from the foregoing, and it will be readily concluded by those skilled in the art that when waste is to be deposited into receptacle 10 it is unnecessary to touch the container with the hands but only incumbent upon the operator to step on pedal 30 as the first movement. When lid 14 is swung to the open position, the waste is dropped into receptacle 10, whereupon pedal 30 is released to permit lid 14 and its supported plunger assembly 20 to drop by gravity to the condition shown in full lines of Fig. 1. If the receptacle 10 is over half full, then the next motion by the operator is to step upon platform 24 to force head 18 against the waste within receptacle 10 to compress the same. Not until after receptacle 10 has been completely filled with tightly compacted substance, is it necessary to withdraw the receptacle for emptying.

Figure 4:
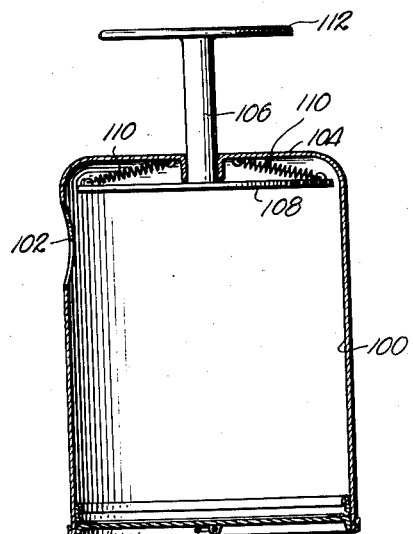
Fig. 4 is a vertical central sectional view through a waste container constructed to embody a modified form of the invention.

In the form of the invention illustrated in Fig. 4, the inner receptacle above described, is entirely eliminated and the receptacle 100 directly receives the waste through an opening 102 in the side thereof. The top 104 slidably receives stem 106 of the pedestal, which is substantially the same in form as plunger 20 above described.

The head 108 is within receptacle 100 and normally maintained above opening 102 and in the position illustrated in Fig. 4.

A number of radially disposed springs 110 yieldably maintain head 108 in the normal position, and platform 112 is formed to a size for convenient engagement.

The bottom 114 of the receptacle, is removable and held in place by friction or otherwise as may be desired. The flanged bottom 114 will always rest upon the surface supporting the receptacle, and therefore, the compressing action of head 108 upon the waste disposed between said head and the bottom 114, will not accidentally dislodge the bottom.

In the form of the invention just described and illustrated in Fig. 4, waste is deposited in receptacle 100 through opening 102 and head 108 may serve to press the waste into a compact mass so long as it is possible to force any of the waste material inwardly through opening 102.

Manifestly, both forms of the invention illustrated and described, embody the broad concepts of my invention. The fact that the invention may be built into receptacles of the character shown is in indication that containers having physical characteristics different from those hereby revealed, may be made without departing from the scope of the appended claim.

Having thus described the invention, what is claimed as new and desired to be secured by Letters Patent is:

A waste container comprising an open top receptacle; an open top housing for the receptacle provided with a swingable lid for closing the top thereof; a plunger reciprocably carried by the lid for movement to and from a position in the waste receptacle to compress the waste therein; and yieldable means attached to the plunger for holding the same inoperative above the top of the receptacle, said plunger having a head thereon substantially the same diameter as the receptacle, said head being disposed above the receptacle when in the inoperative position, said yieldable means comprising springs interconnecting said head and the housing and being disposed substantially perpendicular to the axis of said plunger when in said inoperative position.

SAMUEL BLOOMFIELD.

REFERENCES CITED

The following references are of record in the file of this patent:

UNITED STATES PATENTS

| Number | Name | Date |
|---|---|---|
| 431,224 | Cook | July 1, 1890 |
| 649,600 | Duckworth | May 15, 1900 |
| 765,116 | Williams | July 12, 1904 |
| 960,028 | Low | May 31, 1910 |
| 1,247,058 | Zifferer | Nov. 20, 1917 |
| 2,178,797 | La Vigne | Nov. 7, 1939 |
| 2,230,019 | Tucke | Jan. 28, 1941 |
| 2,248,108 | Mihalko | July 8, 1941 |
| 2,271,918 | Glowka | Feb. 3, 1942 |
| 2,387,839 | Frost | Oct. 30, 1945 |

FOREIGN PATENTS

| Number | Country | Date |
|---|---|---|
| 19,113 | Great Britain | 1910 |